(12) United States Patent
Wang et al.

(10) Patent No.: US 12,464,658 B2
(45) Date of Patent: Nov. 4, 2025

(54) DISPLAY DEVICE

(71) Applicant: BOE Technology Group Co., Ltd., Beijing (CN)

(72) Inventors: Zongyuan Wang, Beijing (CN); Hong Zhu, Beijing (CN); Junhuan Liu, Beijing (CN); Houkun Zhu, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 18/031,174

(22) PCT Filed: Mar. 25, 2022

(86) PCT No.: PCT/CN2022/083152
§ 371 (c)(1),
(2) Date: Apr. 11, 2023

(87) PCT Pub. No.: WO2023/178679
PCT Pub. Date: Sep. 28, 2023

(65) Prior Publication Data
US 2024/0373567 A1 Nov. 7, 2024

(51) Int. Cl.
*H05K 5/02* (2006.01)
(52) U.S. Cl.
CPC .................. *H05K 5/0217* (2013.01)
(58) Field of Classification Search
CPC ... H05K 5/0217; G06F 1/1624; G06F 1/1652; G09F 9/30
See application file for complete search history.

(56) References Cited

U.S. PATENT DOCUMENTS

| | | | |
|---|---|---|---|
| 11,194,363 B2 * | 12/2021 | Kim | ..................... G06F 1/1637 |
| 11,240,923 B2 | 2/2022 | Wang et al. | |
| 11,315,443 B2 | 4/2022 | Han | |
| 11,361,681 B2 | 6/2022 | Feng | |
| 11,532,247 B2 | 12/2022 | Feng | |

(Continued)

FOREIGN PATENT DOCUMENTS

| | | |
|---|---|---|
| CN | 104461127 A | 3/2015 |
| CN | 110033707 A | 7/2019 |

(Continued)

OTHER PUBLICATIONS

Machine translation of CN 113593411 (Year: 2025).*

*Primary Examiner* — Sagar Shrestha
(74) *Attorney, Agent, or Firm* — XSENSUS LLP

(57) ABSTRACT

A display device includes a first housing, a second housing, a flexible display panel, and a tension strip; one side of the first housing has an opening; and the second housing is partially accommodated in the opening. The second housing includes a support part, a push rod and a pulley, one end of the push rod is connected with the support part, and the pulley is located on the other end of the push rod; one end of the flexible display panel is located on a first face of the second housing, and is located on one side of the first housing and connected with the first housing, and the other end rounds the support part and extends to a second face of the second housing; the tension strip is located in the first housing.

13 Claims, 13 Drawing Sheets

(56) References Cited

U.S. PATENT DOCUMENTS

| | | | |
|---|---|---|---|
| 11,632,452 B2* | 4/2023 | Delaporte | G09F 9/301 |
| | | | 345/13 |
| 11,644,867 B2* | 5/2023 | Ahn | G06F 1/1624 |
| | | | 361/679.27 |
| 2012/0314400 A1* | 12/2012 | Bohn | H04B 1/3833 |
| | | | 361/679.01 |
| 2013/0058063 A1* | 3/2013 | O'Brien | G06F 1/1624 |
| | | | 361/807 |
| 2018/0014417 A1* | 1/2018 | Seo | H05K 1/189 |
| 2018/0077808 A1* | 3/2018 | Seo | G06F 3/04164 |
| 2018/0188778 A1* | 7/2018 | Shin | G06F 1/1652 |
| 2020/0314225 A1* | 10/2020 | Ahn | H04M 1/0268 |
| 2021/0044683 A1* | 2/2021 | He | G06F 1/1652 |
| 2021/0076517 A1 | 3/2021 | Wang et al. | |
| 2021/0366318 A1 | 11/2021 | Feng | |
| 2021/0383727 A1 | 12/2021 | Han | |
| 2022/0130287 A1 | 4/2022 | Feng | |
| 2022/0155823 A1* | 5/2022 | Shin | G09F 9/301 |
| 2022/0232716 A1* | 7/2022 | Lim | H05K 5/0217 |
| 2022/0253103 A1* | 8/2022 | Choi | G06F 1/1624 |
| 2022/0397937 A1 | 12/2022 | Sun et al. | |
| 2023/0188631 A1 | 6/2023 | Hongqi et al. | |
| 2023/0247783 A1* | 8/2023 | Cho | G06F 1/1652 |
| | | | 361/807 |

FOREIGN PATENT DOCUMENTS

| | | |
|---|---|---|
| CN | 110047385 A | 7/2019 |
| CN | 110246422 A | 9/2019 |
| CN | 110491289 A | 11/2019 |
| CN | 111613144 A | 9/2020 |
| CN | 112309258 A | 2/2021 |
| CN | 113063075 A | 7/2021 |
| CN | 113242340 A | 8/2021 |
| CN | 113345332 A | 9/2021 |
| CN | 113347294 A | 9/2021 |
| CN | 113593411 A | 11/2021 |
| CN | 113808490 A | 12/2021 |
| CN | 113824821 A | 12/2021 |
| CN | 114203053 A | 3/2022 |

* cited by examiner

DISPLAY DEVICE

CROSS-REFERENCE TO RELATED APPLICATION

This application is a U.S. national stage of international application No. PCT/CN2022/083152, filed on Mar. 25, 2022, the disclosures of which are incorporated herein by reference in its entirety.

TECHNICAL FIELD

The present disclosure relates to the field of display devices, and in particular, to a display device.

BACKGROUND OF THE INVENTION

Flexible display panels are increasingly applied in various display devices, such that the display devices can achieve functions such as folding and curling, thereby changing the display area of the display devices.

For example, in a rollable display device, a flexible display panel is wound outside a reel, and the display area varies depending on the length of the flexible display panel drawn out relative to the reel, such that the display area can be changed as needed. However, in such a display device, it is necessary to wind the flexible display panel in a spiral shape and fix one end of the flexible display panel inside the reel, and the overall structure of the display device is complicated.

SUMMARY OF THE INVENTION

An embodiment of the present disclosure provides a display device, which can change the display area of the display device more simply. The technical solutions are as follows.

In a first aspect, an embodiment of the present disclosure provides a display device. The display device includes a first housing, a second housing, a flexible display panel, and a tension strip;
- one side of the first housing has an opening;
- the second housing is partially accommodated in the opening and stretches and retracts relative to the first housing, the second housing includes a support part, a push rod, and a pulley, one end of the push rod is connected with the support part, and the pulley is located on the other end of the push rod;
- one end of the flexible display panel is located on a first face of the second housing, and is located on one side of the first housing and connected with the first housing, the other end of the flexible display panel rounds the support part and extends to a second face of the second housing, and the second face of the second housing is a face opposite to the first face of the second housing; and
- the tension strip is located in the first housing, one end of the tension strip is located on the second face of the second housing and connected with the flexible display panel, and the other end of the tension strip rounds the pulley, extends to the first face of the second housing, and is connected with the first housing.

Optionally, the support part includes a roller and a roller bracket, and the roller and the push rod are located on two opposite sides of the roller bracket and connected with the roller bracket.

Optionally, the support part further includes a plurality of magnetic rings, the plurality of magnetic rings are sleeved outside the roller, one face of the flexible display panel closer to the magnetic rings is provided with a flexible support plate, and the flexible support plate is ferromagnetic.

Optionally, the second housing further includes a sliding plate, the sliding plate and the push rod are located on a same side of the roller bracket, and the sliding plate is connected with the roller bracket and slidably connected with the first housing.

Optionally, a surface of the sliding plate closer to the flexible display panel is provided with a plurality of magnetic sheets.

Optionally, the flexible support plate includes a first support plate, a second support plate, and a connection plate, the first support plate and the connection plate are located on opposite sides of the second support plate, the first support plate is connected with an outer wall of the first housing, a plurality of strip-shaped holes are distributed on the second support plate, the second support plate extends from the first face to the second face of the second housing, and the connection plate is connected with the tension strip.

Optionally, the push rod has a strip-shaped groove extending along a length direction thereof, and the pulley is located in the strip-shaped groove.

Optionally, the second housing includes a plurality of push rods and a plurality of pulleys in one-to-one correspondence, and the plurality of push rods are arranged in parallel at intervals; and
- the display device includes a plurality of tension strips, the plurality of tension strips are arranged in one-to-one correspondence with the plurality of pulleys, and the plurality of tension strips round the corresponding pulleys.

Optionally, the display device further includes a recovery plate, the recovery plate is located on the second face of the second housing and connected with an edge of the flexible display panel; and
- the plurality of tension strips are each connected with the recovery plate.

Optionally, the display device further includes a baffle plate, the baffle plate is located on the second face of the second housing and connected with the second housing, and the flexible display panel is located on one face of the baffle plate closer to the second housing; and
- the recovery plate is provided with a rolling member, and the rolling member forms a fit with the baffle plate in a rolling manner.

Optionally, the display device further includes a plurality of guide rails and a plurality of sliding blocks, the plurality of guide rails are located in the first housing and connected with the first housing, the plurality of guide rails are parallel to each other, and one end of each of the plurality of guide rails is closer to the opening; and
- the sliding block is slidably connected with the guide rail and connected with the second housing.

Optionally, the sliding block has a clamp groove, a side wall of the clamp groove has a first groove, and the first groove is provided with a ball; and
- the guide rail is located in the clamp groove, a side wall of the guide rail is provided with a second groove extending along a length direction thereof, the first groove is opposite to the second groove, and the ball is partially located in the second groove.

Optionally, a cross section of the first groove and a cross section of the second groove are circular arc-shaped, and a radius of the cross section of the first groove and a radius of the cross section of the second groove are both the same as a radius of the ball.

Optionally, the cross section of the second groove is semi-circular.

Optionally, the display device further includes two end caps, the two end caps are located at two ends of the clamp groove and connected with the sliding block.

The technical solutions according to the embodiments of the present disclosure at least achieve the following beneficial effects.

By connecting one end of the flexible display panel to the first housing, the flexible display panel is wound from the first face to the second face of the second housing and then connected with the tension strip, and the tension strip extends to the first face of the second housing and is fixed to the first housing. In a case that the second housing extends relative to the first housing, the support part of the second housing pushes the flexible display panel outwards, such that a larger portion of the flexible display panel moves to the first face of the second housing, and the flexible display panel keeps flat under the action of the tension strip, such that normal display can be achieved. In a case that the second housing retracts relative to the first housing, the push rod of the second housing pushes the tension strip through the pulley, so as to enable the tension strip to pull the flexible display panel inwards, such that one portion of the flexible display panel moves from the first face to the second face of the second housing, and the flexible display panel keeps flat under the action of the tension strip, such that normal display can be achieved. By adjusting the first housing and the second housing, the area of the flexible display panel on the first face of the second housing can be changed, such that the display area is changed, and the structure is simple.

BRIEF DESCRIPTION OF THE DRAWINGS

For clearer illustration of the technical solutions in the embodiments of the present disclosure, the drawings required to be used in the description of the embodiments are briefly introduced below. It is apparent that the drawings in the description below are only some embodiments of the present disclosure, and for those of ordinary skill in the art, other drawings may be derived according to the drawings without creative efforts.

DETAILED DESCRIPTION

For clearer descriptions of the objects, technical solutions, and advantages of the present disclosure, the embodiments of the present disclosure are further described in detail below with reference to the drawings.

Unless otherwise defined, technical or scientific terms used herein shall have the ordinary meaning as understood by those of ordinary skill in the art to which the present disclosure belongs. "First", "second", "third", and other similar words, as used in the specification and in the claims of the patent application of the present disclosure, do not indicate any order, quantity, or importance, but are merely defined to distinguish different components. Likewise, "a", "an" or other similar words does not indicate a limitation of quantity, but rather the presence of at least one. "Include", "comprise" or other similar words means that the elements or objects stated before "include" or "comprise" encompass the elements or objects and equivalents thereof listed after "include" or "comprise", but does not exclude other elements or objects. "Connecting", "connected" or other similar words are not defined to physical or mechanical connections, but may include electrical connections, whether direct or indirect. "Up", "down", "left", "right", and the like, are merely defined to indicate relative positional relationships. In a case that the absolute position of the described object is changed, the relative position relationship may be changed accordingly.

Figure 1:
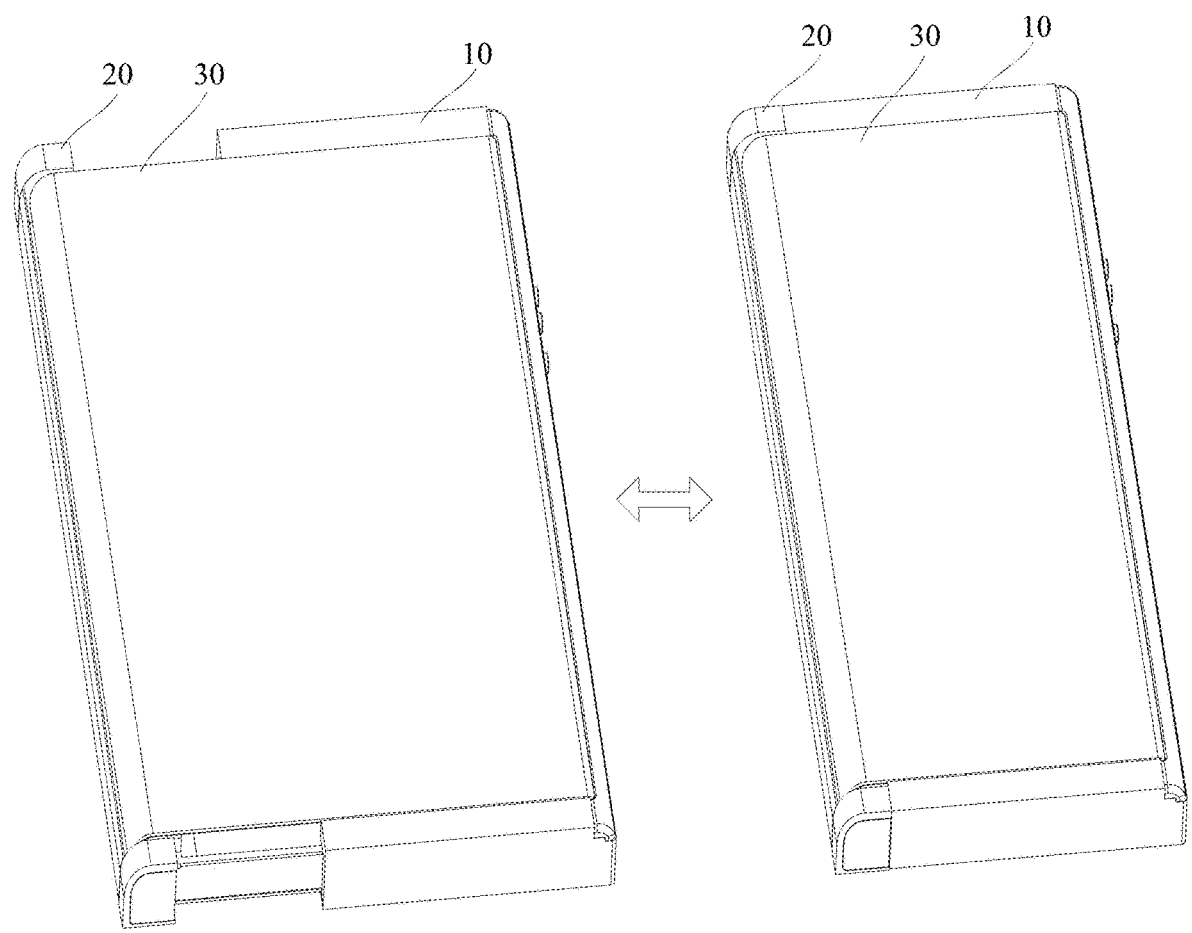
FIG. 1 is a schematic structural diagram of a display device according to an embodiment of the present disclosure.

FIG. 1 is a schematic structural diagram of a display device according to an embodiment of the present disclosure. The display device may be, but is not limited to, a mobile phone or a tablet computer. In an embodiment of the present disclosure, a mobile phone is taken as an example for illustration. As shown in FIG. 1, the display device includes a first housing 10, a second housing 20, a flexible display panel 30, and a tension strip 40.

Figure 2:
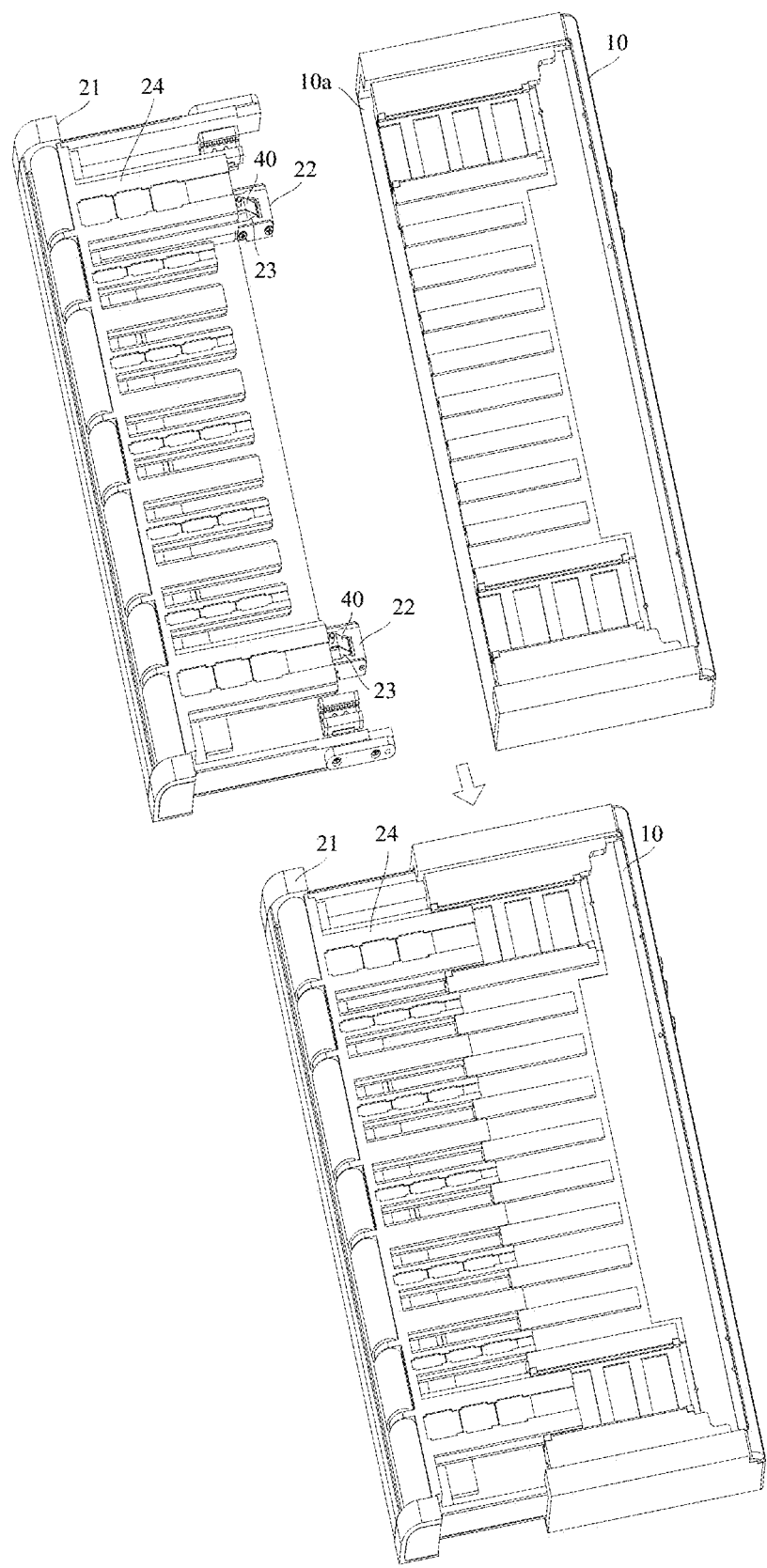
FIG. 2 is a schematic assembly diagram of a first housing and a second housing according to an embodiment of the present disclosure.

FIG. 2 is a schematic assembly diagram of a first housing and a second housing according to an embodiment of the present disclosure. As shown in FIG. 2, one side of the first housing 10 has an opening 10a, and the second housing 20 is partially accommodated in the opening 10a. The second housing 20 can stretch and retract relative to the first housing 10. By adjusting the second housing 20 relative to the first housing 10, the display area of the flexible display panel 30 can be changed.

As shown in FIG. 2, the second housing 20 includes a support part 21, a push rod 22 and a pulley 23, one end of the push rod 22 is connected with the support part 21, and the pulley 23 is located on the other end of the push rod 22.

Figure 3:
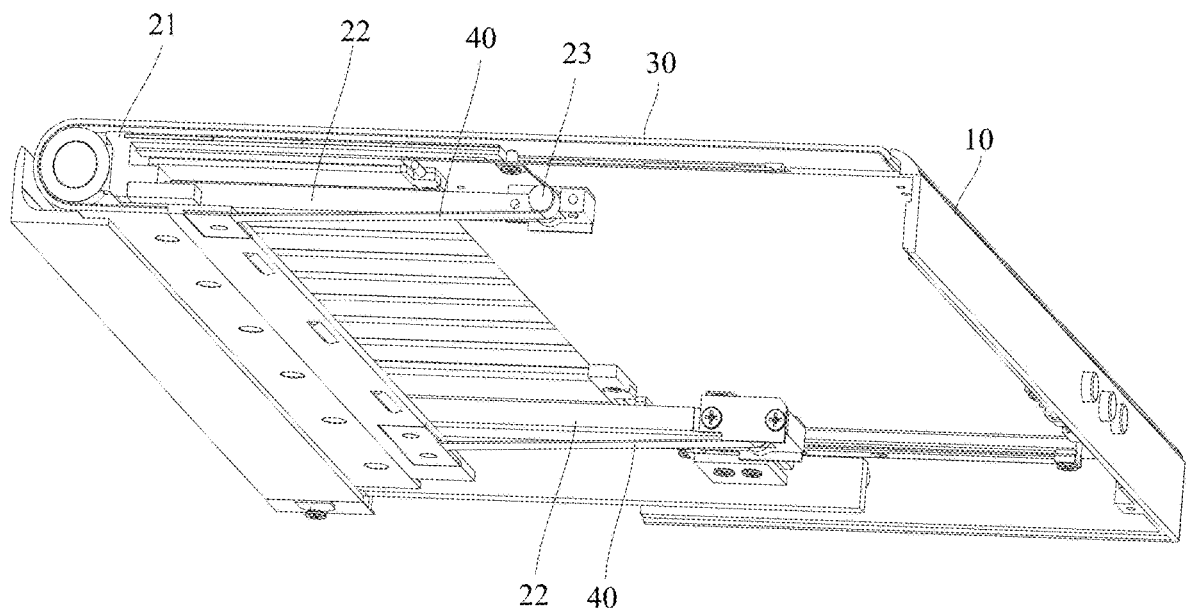
FIG. 3 is a schematic structural diagram of a display device according to an embodiment of the present disclosure.
Figure 4:
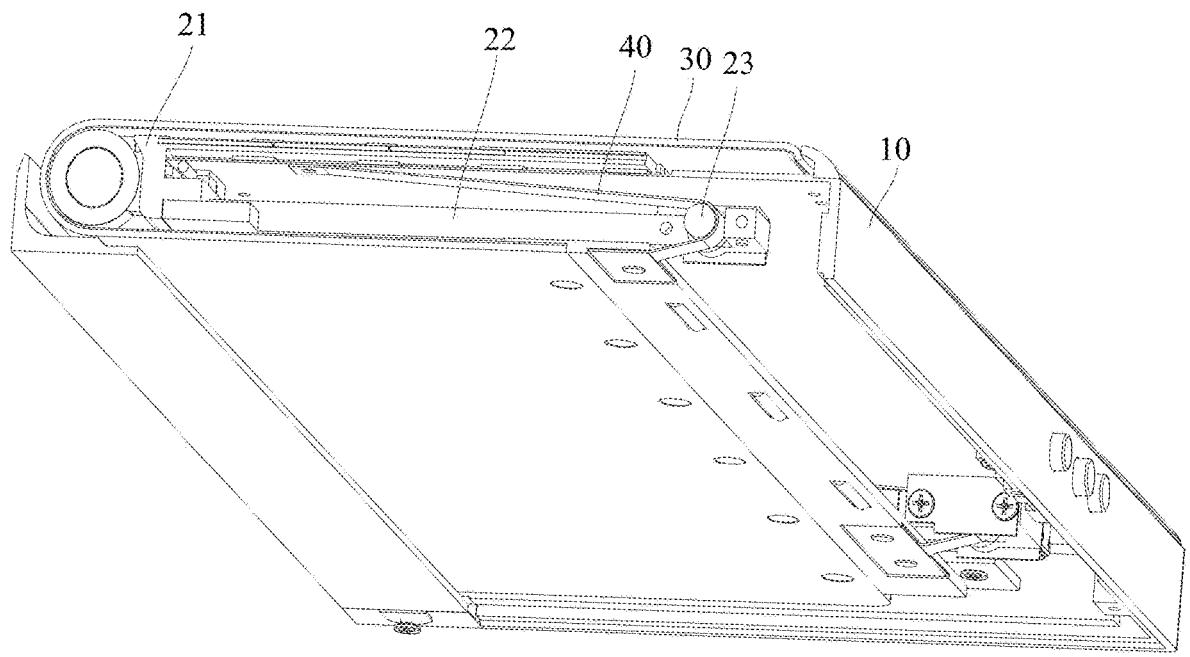
FIG. 4 is a schematic structural diagram of a display device according to an embodiment of the present disclosure.

FIG. 3 and FIG. 4 are schematic structural diagrams of a display device according to an embodiment of the present disclosure. Partial structure of the display device is removed in each of FIG. 3 and FIG. 4 to show the internal structure of the display device. FIG. 3 and FIG. 4 show two states of the display device, respectively. As shown in FIG. 3 and FIG. 4, a first end of the flexible display panel 30 is located at a first face of the second housing 20. A second face of the second housing 20 is a face opposite to the first face of the second housing 20. The second housing 20 has the first face and the second face opposite to each other. In a case that a user is viewing a display screen of the display device, the first face of the second housing 20 faces towards the user, and the second face of the second housing 20 faces farther away from the user. The flexible display panel 30 is rectangular in a flattened state, and the first end and the second end of the flexible display panel 30 are two ends in a length direction of the flexible display panel 30 in the flattened state.

The first end of the flexible display panel 30 is located on one side of the first housing 10 and connected with the first housing 10. The second end of the flexible display panel 30 rounds the support part 21 and extends to the second face of the second housing 20.

The tension strip 40 is located in the first housing 10, one end of the tension strip 40 is located on the second face of the second housing 20 and connected with the flexible display panel 30. The other end of the tension strip 40 rounds the pulley 23, extends to the first face of the second housing 20, and is connected with the first housing 10. For example, the tension strip 40 is connected with the first housing 10 by a screw.

By connecting one end of the flexible display panel 30 to the first housing 10, the flexible display panel 30 is wound from the first face to the second face of the second housing 20 and then connected with the tension strip 40, the tension strip 40 extends to the first face of the second housing 20 and is fixed to the first housing 10. In a case that the second housing 20 extends relative to the first housing 10, the support part 21 of the second housing 20 pushes the flexible display panel 30 outwards, such that a larger portion of the flexible display panel 30 moves to the first face of the second housing 20, and the flexible display panel 30 keeps flat under the action of the tension strip 40, such that normal display can be achieved. In a case that the second housing 20 retracts relative to the first housing 10, the push rod 22 of the second housing 20 pushes the tension strip 40 through the pulley 23, so as to enable the tension strip 40 to pull the flexible display panel 30 inwards, such that one portion of the flexible display panel 30 moves from the first face to the second face of the second housing 20, and the flexible display panel 30 keeps flat under the action of the tension strip 40, such that normal display can be achieved. By adjusting the first housing 10 and the second housing 20, the area of the flexible display panel 30 on the first face of the second housing 20 can be changed, such that the display area is changed, and the structure is simple.

Figure 5:
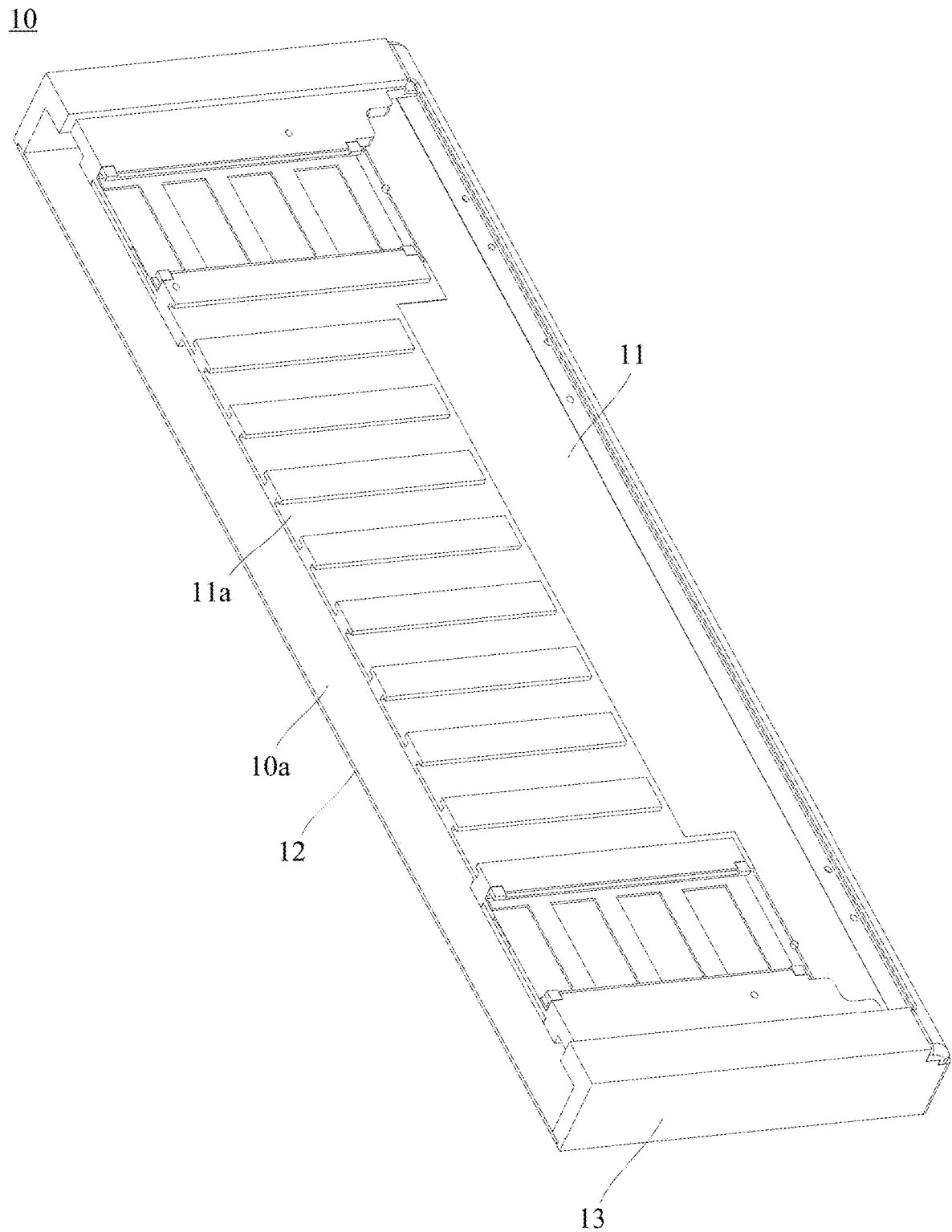
FIG. 5 is a schematic structural diagram of a first housing according to an embodiment of the present disclosure.

FIG. 5 is a schematic structural diagram of a first housing according to an embodiment of the present disclosure. As shown in FIG. 5, the first housing 10 includes a top plate 11, a back plate 12, and a plurality of side plates 13, the top plate 11 and the back plate 12 are opposite to each other, the plurality of side plates 13 are connected between the top plate 11 and the back plate 12, and the top plate 11, the back plate 12, and the plurality of side plates 13 are enclosed to form a box-shaped structure with an opening 10a on one side to partially accommodate the first housing 10. One end of the flexible display panel 30 is located on the outside of the first housing 10, that is, is located outside a space formed by enclosing the top plate 11, the back plate 12, and the plurality of side plates 13. Specifically, is located on one side of the top plate 11 farther away from the back plate 12.

The first housing 10 may be an integral structure or a detachable structure. For example, the back plate 12 is detachably connected with the side plate 13 to facilitate the disassembly and assembly of the display device.

Figure 6:
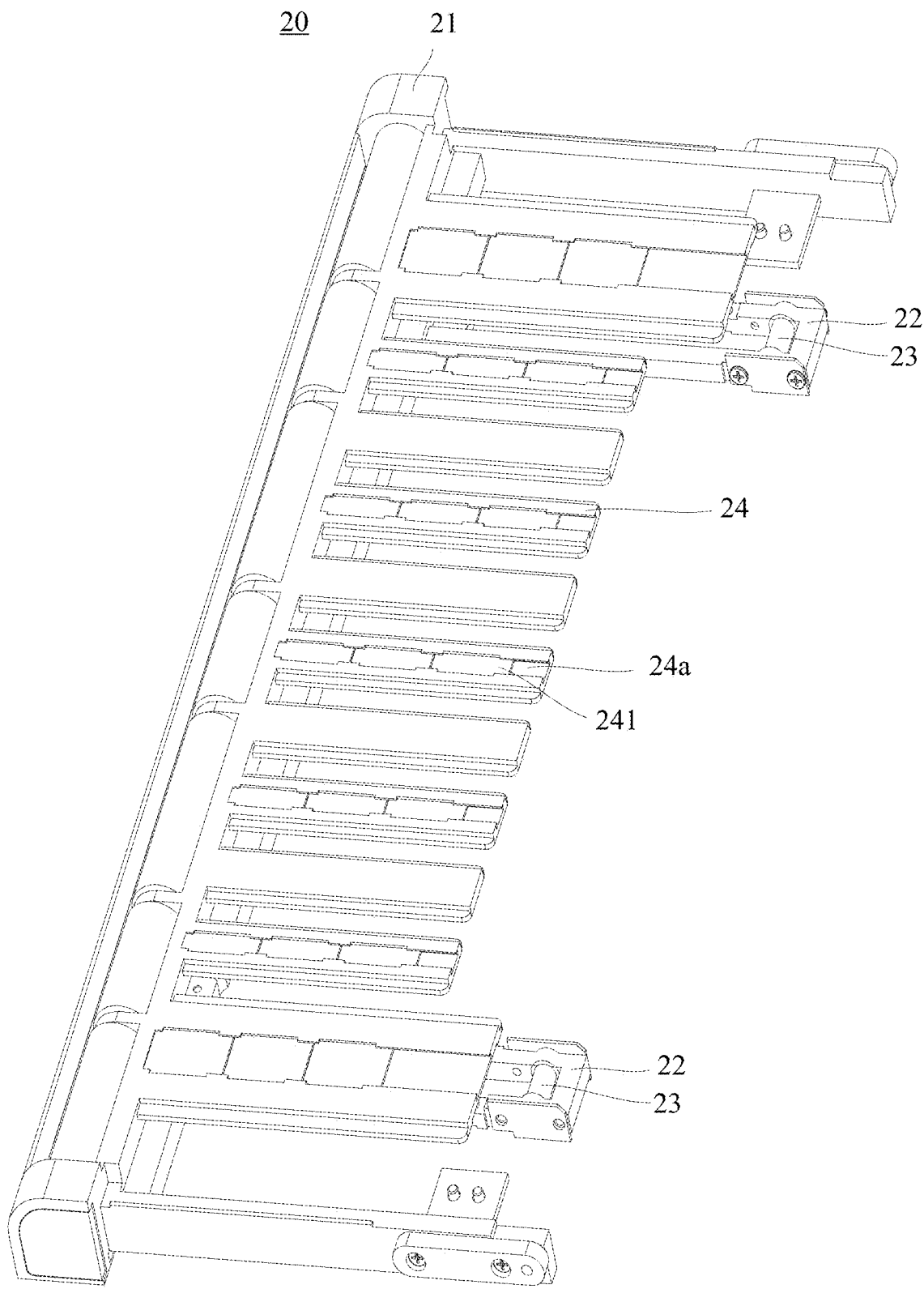
FIG. 6 is a schematic structural diagram of a second housing according to an embodiment of the present disclosure.

FIG. 6 is a schematic structural diagram of a second housing according to an embodiment of the present disclosure. As shown in FIG. 6, the second housing 20 includes a support part 21, a sliding plate 24, a push rod 22, and a pulley 23.

Figure 7:
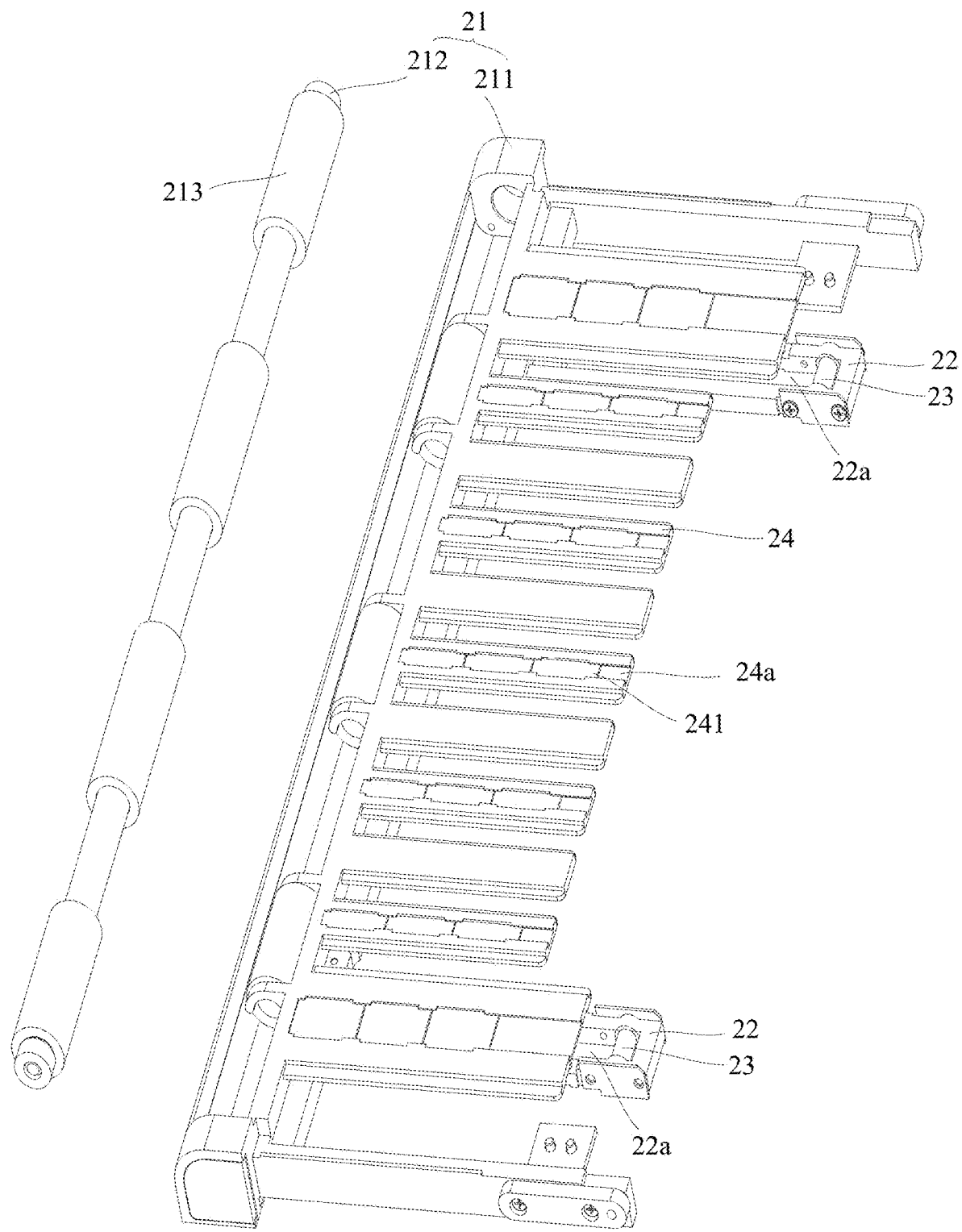
FIG. 7 is a schematic exploded structural diagram of a second housing according to an embodiment of the disclosure.

FIG. 7 is a schematic exploded structural diagram of a second housing according to an embodiment of the disclosure. As shown in FIG. 7, the support part 21 includes a roller 212 and a roller bracket 211, and the roller 212 and the push rod 22 are located on two opposite sides of the roller bracket 211, respectively, and are separately connected with the roller bracket 211.

The roller 212 is rotatably connected with the roller bracket 211, and the roller 212 can rotate relative to the roller bracket 211. The flexible display panel 30 is wound from the first face to the second face of the second housing 20 through the roller 212, such that the flexible display panel 30 moves relative to the second housing 20 with less resistance and smoother movement.

Optionally, the second housing 20 includes a plurality of push rods 22 and a plurality of pulleys 23 in one-to-one correspondence, and the plurality of push rods 22 are arranged in parallel at intervals. For example, in the embodiment, the second housing 20 includes two push rods 22 and two pulleys 23, the two push rods 22 are arranged in parallel at intervals along a length direction of the roller 212, and one end of each of the push rods 22 farther away from the roller bracket 211 is provided with one pulley 23.

The display device includes a plurality of tension strips 40, the plurality of tension strips 40 are arranged in one-to-one correspondence with the plurality of pulleys 23, and the plurality of tension strips 40 round the corresponding pulleys 23.

By providing the plurality of push rods 22 and the plurality of tension strips 40, the plurality of tension strips 40 apply force to different positions of the flexible display panel 30, such that the flexible display panel 30 can move more smoothly, and are flatter.

Optionally, the tension strip 40 may be a flexible member, such as a strip-shaped structure made of polyethylene terephthalate, polyimide, stainless steel, and other materials, which is easily bent flexibly to successfully round the pulley 23 during a relative movement of the first housing 10 and the second housing 20, so as to prevent the flexible display panel 30 from being excessively pulled and damaged by excessive stress. Moreover, the tension strip 40 made of the materials has small deformation in a length direction thereof, and can avoid conditions of pause and discontinuity during movement.

Optionally, the push rod 22 has a strip-shaped groove 22a extending along a length direction thereof. The pulley 23 is located in the strip-shaped groove 22a.

By providing the strip-shaped groove 22a, in a case of installing the pulley 23, a shaft of the pulley 23 can be connected to side walls of the strip-shaped groove 22a, such that the installation of the pulley 23 is facilitated. Moreover, after the pulley 23 is installed in the strip-shaped groove 22a, the strip-shaped groove 22a provides protection for the pulley 23, so as to prevent other structures in the display device from contacting the pulley 23 to affect a normal rotation of the pulley 23.

In addition, since the pulley 23 is in the strip-shaped groove 22a, the tension strip 40 needs to pass through the strip-shaped groove 22a in a case of rounding the pulley 23, and the strip-shaped groove 22a can limit the tension strip 40 to prevent the tension strip 40 from detaching from the pulley 23, thereby improving the reliability of the display device.

Optionally, the pulley 23 may be a rubber wheel. The rubber wheel has a certain elasticity and can deform to a certain extent in a case of contacting the tension strip 40, so as to enable the tension strip 40 to have a relatively large contact face with the pulley 23. The rubber wheel has a large friction coefficient and can generate a relatively large friction force with the tension strip 40, so as to avoid slippage between the tension strip 40 and the pulley 23.

In some other embodiments, the pulley 23 may be a metal wheel or a plastic wheel. A bearing may further be provided at an axle of the pulley 23 to reduce a rotational friction force of the pulley 23.

As shown in FIG. 7, the sliding plate 24 and the push rod 22 are located on the same side of the roller bracket 211. The sliding plate 24 is connected with the roller bracket 211. Referring to FIG. 2, the sliding plate 24 is slidably connected with the first housing 10.

The sliding plate 24 forms a fit with the first housing 10, such that the second housing 20 can move smoothly relative to the first housing 10.

As shown in FIG. 7, the sliding plate 24 is comb-shaped. Referring to FIG. 5, an outer surface of the top plate 11 of the first housing 10 has a plurality of sliding grooves 11a, the sliding grooves 11a extend from one side of the top plate 11 closer to the opening 10a to the other side, and the sliding plates 24 are inserted into the plurality of sliding grooves 11a to form a fit with the sliding grooves 11a, such that the sliding plates can slide along the sliding grooves 11a.

Optionally, the thickness of the sliding plate 24 is the same as the depth of the sliding groove 11a, which makes a surface of the sliding plate 24 closer to the flexible display panel 30 flush with the outer surface of the top plate 11, so as to provide support for the flexible display panel 30 and keep the flexible display panel 30 flat.

As shown in FIG. 7, a surface of the sliding plate 24 closer to the flexible display panel 30 is provided with a plurality of magnetic sheets 241.

The sliding plate 24 is located on the outside of the top plate 11 of the first housing 10, the magnetic sheet 241 is provided on the surface of the sliding plate 24 farther away from the top plate 11, the magnetic sheet 241 is closer to a rear face of the flexible display panel 30, and the magnetic sheet 241 is configured to adsorb the flexible display panel 30, so as to prevent the flexible display panel 30 from arching under its own elasticity, and keep the flexible display panel 30 flatter. A front face of the flexible display panel 30 is a face configured to display, and a rear face is a face opposite to the front face.

As shown in FIG. 7, the surface of the sliding plate 24 has an installation groove 24a, and the magnetic sheet 241 is provided in the installing groove 24a. For example, the installation groove 24a extends from one side of the sliding plate 24 farther away from the roller bracket 211 to one side closer to the roller bracket 211, so as to facilitate sliding the magnetic sheet 241 into the installation groove 24a.

In other examples, the magnetic sheet 241 may be installed on the surface of the sliding plate 24 by pasting.

As shown in FIG. 7, the support part 21 further includes a plurality of magnetic rings 213. The plurality of magnetic rings 213 are sleeved outside the roller 212.

The magnetic ring 213 can not only function to support the flexible display panel 30 to enable the flexible display panel 30 to move smoothly relative to the second housing 20, but also can absorb the flexible display panel 30 as the magnetic sheet 241 to prevent the flexible display panel 30 from arching.

In order to enable the flexible display panel 30 to be absorbed by the magnetic sheet 241, a corresponding ferromagnetic structure is provided on the rear face of the flexible display panel 30, which will be described in detail later.

Figure 8:
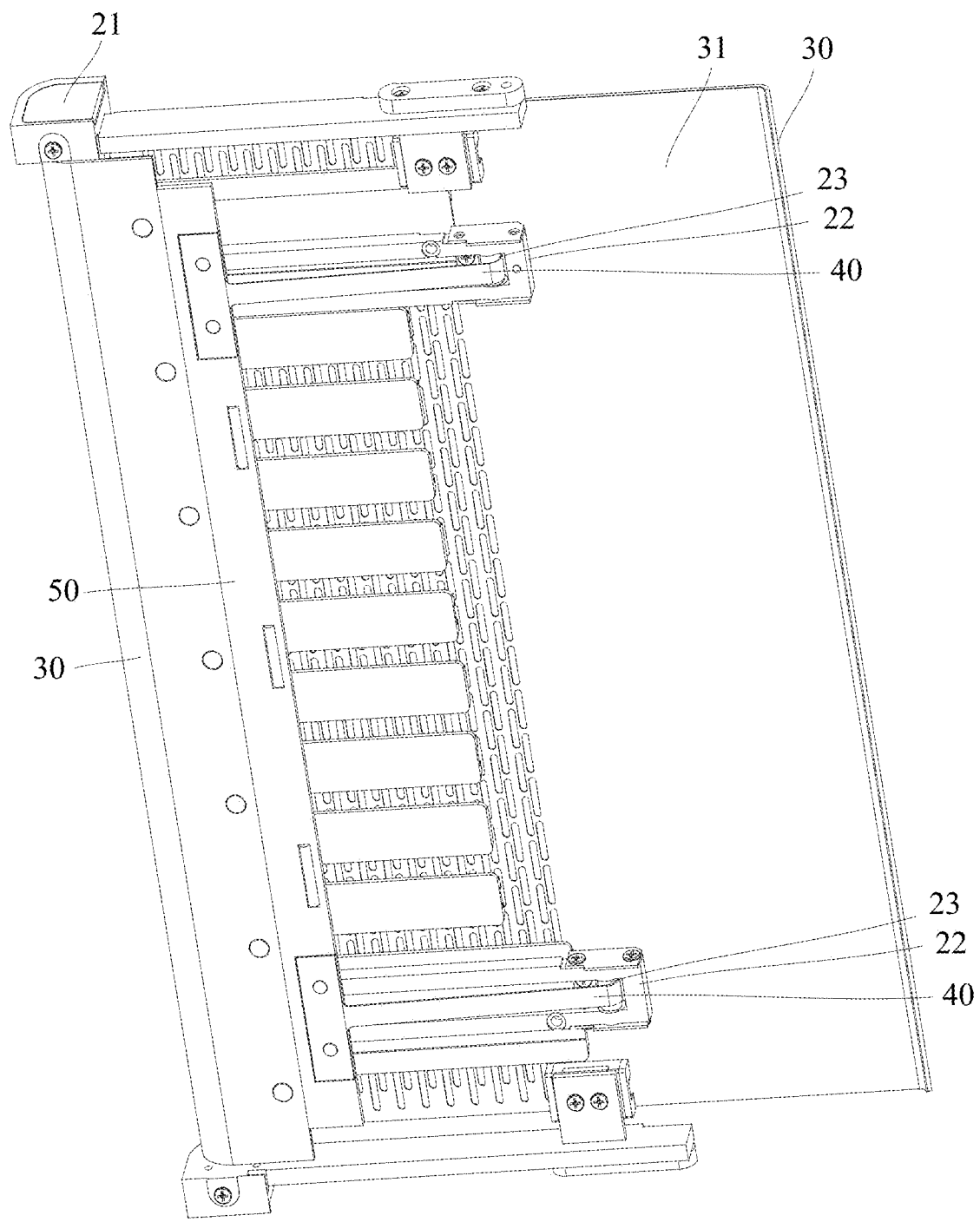
FIG. 8 is a schematic partial structural diagram of a display device according to an embodiment of the present disclosure.

FIG. 8 is a schematic partial structural diagram of a display device according to an embodiment of the present disclosure. As shown in FIG. 8, one face of the flexible display panel 30 closer to the magnetic rings 213 is provided with a flexible support plate 31, and the flexible support plate 31 is ferromagnetic.

The flexible support plate 31 functions to support the flexible display panel 30. The flexible support plate 31 is ferromagnetic and thus can be absorbed by the magnetic sheet 241 and the magnetic ring 213, such that the flexible support plate 31 is kept flat, which also keeps the flexible display panel 30 flat.

For example, the flexible support plate 31 is bonded to the flexible display panel 30, such that the flexible display panel 30 can be bent with the flexible support plate 31.

Figure 9:
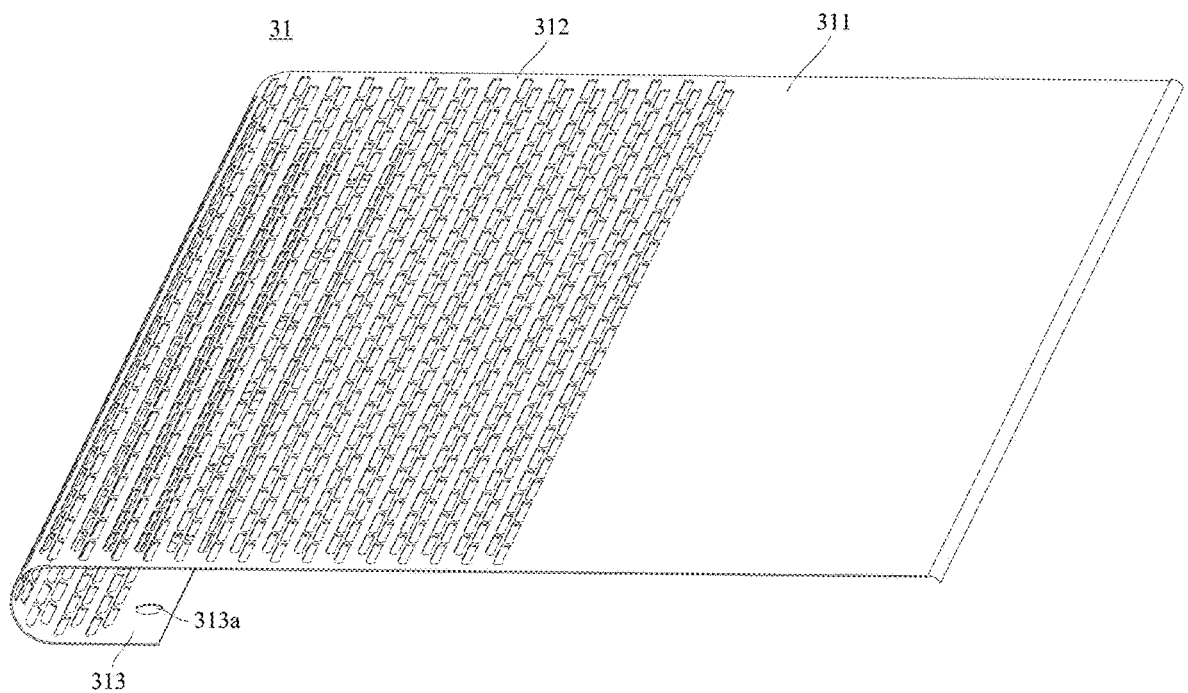
FIG. 9 is a schematic structural diagram of a flexible support plate according to an embodiment of the present disclosure.

FIG. 9 is a schematic structural diagram of a flexible support plate according to an embodiment of the present disclosure. As shown in FIG. 9, a flexible support plate 31 includes a first support plate 311, a second support plate 312, and a connection plate 313. The first support plate 311 and the connection plate 313 are located on opposite sides of the second support plate 312, respectively. The first support plate 311 is connected with an outer wall of the first housing 10, a plurality of strip-shaped holes 312a are distributed on the second support plate 312, the second support plate 312 extends from the first face to the second face of the second housing 20, and the connection plate 313 is connected with the tension strip 40.

During the relative movement of the first housing 10 and the second housing 20, one portion of the flexible display panel 30 is always located on the outside of the top plate 11 of the first housing 10, and the portion of the flexible display panel 30 will not be bent. The portion of the flexible display panel 30 is supported by the first support plate 311, such that the part is always kept flat. The plurality of strip-shaped holes 312a are distributed on the second support plate 312, such that the second support plate 312 can be bent on the basis of keeping a certain structural strength. The plurality of tension strips 40 are connected with the connection plate 313, such that the torsional deformation of the second support plate 312 due to uneven stress can be avoided, and the flexible support plate 31 can move smoothly under the traction of the tension strip 40.

As shown in FIG. 9, the plurality of strip-shaped holes 312a are distributed in an array on the second support plate 312, and the strip-shaped holes 312a are parallel to each other and all parallel to the roller 212, such that the second support plate 312 can be bent in an extending direction of the strip-shaped holes 312a, and has a certain strength in a direction perpendicular to the extending direction of the strip-shaped holes 312a, and thus is not easy to deform.

For example, the flexible support plate 31 may be a stainless steel structural member, such as stainless steel SUS316 and SUS430.

As shown in FIG. 8, the display device further includes a recovery plate 50. The recovery plate 50 is located on the second face of the second housing 20 and connected with an edge of the flexible display panel 30. The plurality of tension strips 40 are all connected with the recovery plate 50.

By providing the recovery plate 50, a force of the plurality of tension strips 40 can be more evenly applied to the flexible display panel 30, such that the flexible display panel 30 is more flat and moves more smoothly.

Figure 10:
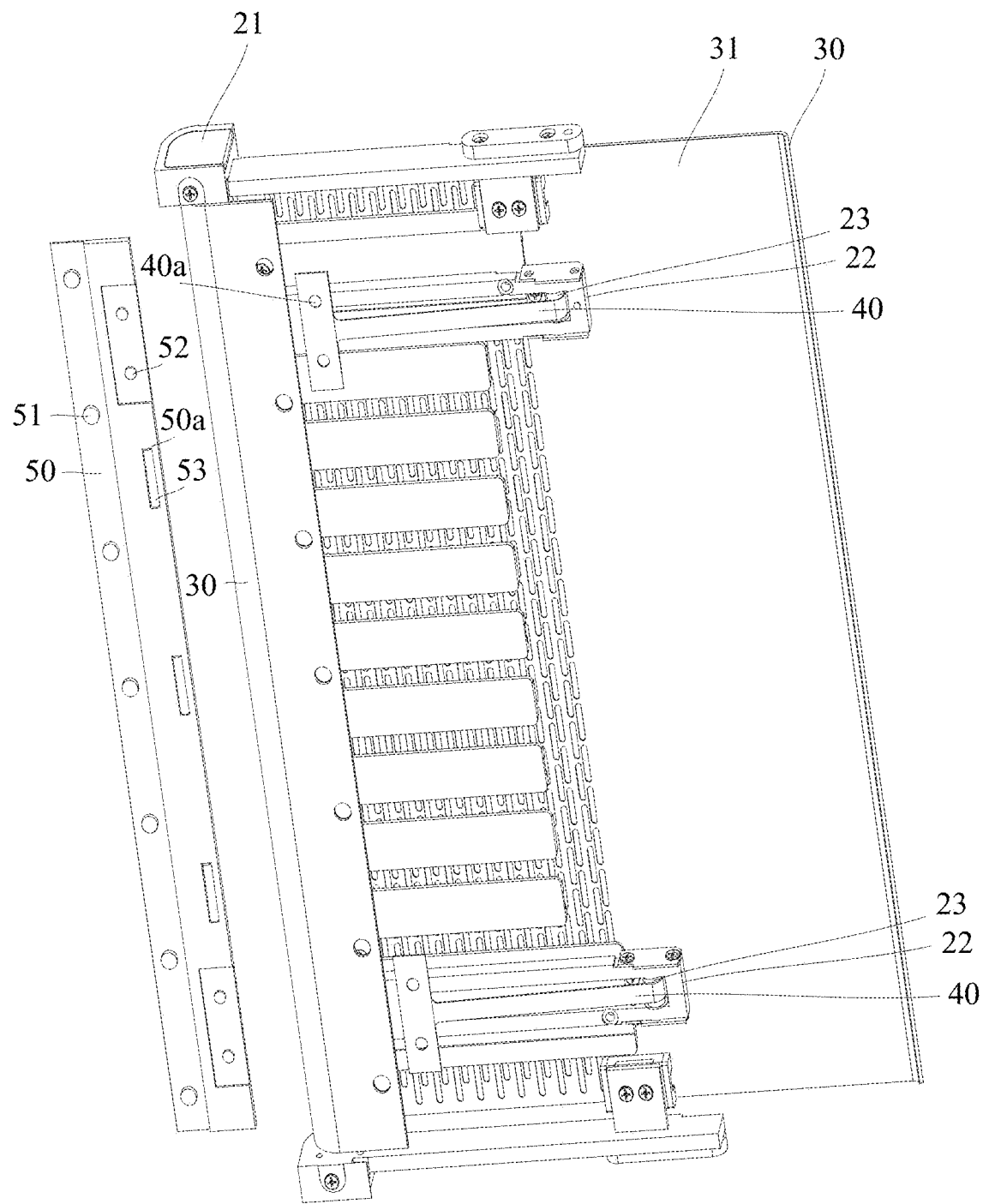
FIG. 10 is a schematic partial exploded structural diagram of a display device according to an embodiment of the present disclosure.

FIG. 10 is a schematic partial exploded structural diagram of a display device according to an embodiment of the present disclosure. As shown in FIG. 10, a surface of the recovery plate 50 has a plurality of first columnar projections 51 and a plurality of second columnar projections 52, and the first columnar projections 51 and the second columnar projections 52 are located on opposite sides of the recovery plate 50. The plurality of first columnar projections 51 and the plurality of second columnar projections 52 are all arranged along a side of the recovery plate 50.

A connection plate 313 has a plurality of first connection holes 313a, the plurality of first connection holes 313a are arranged along a side of the connection plate 313 farther away from the second support plate 312, and the plurality of first connection holes 313a are sleeved outside the plurality of first columnar projections 51. A position corresponding to the first connection hole 313a on the flexible display panel 30 may also be provided with a connection hole, and the connection hole is sleeved outside the first columnar projection 51. An end of the tension strip 40 has a second connection hole 40a, and second connection holes 40a of the plurality of tension strips 40 are sleeved outside the plurality of second columnar projections 52, respectively. Forces applied by the plurality of tension strips 40 act on the recovery plate 50 through the plurality of second columnar projections 52, and then act on the flexible support plate 31 from the recovery plate 50 through the plurality of first columnar projections 51, thereby making the force applied on the flexible support plate 31 more even.

Optionally, the recovery plate 50 and the flexible support plate 31 may further be bonded, for example, by a double-sided adhesive tape, foam adhesive, or other adhesive layers, so as to avoid deformation due to excessive stress at the first connection hole 313a. The first connection hole 313a forms a fit with the first columnar projection 51, such that the slippage of the adhesive layer after the display device is used for a long time can be avoided, thereby ensuring the reliability of connection between the flexible support plate 31 and the recovery plate 50, and the flatness of the flexible display panel 30.

Figure 11:
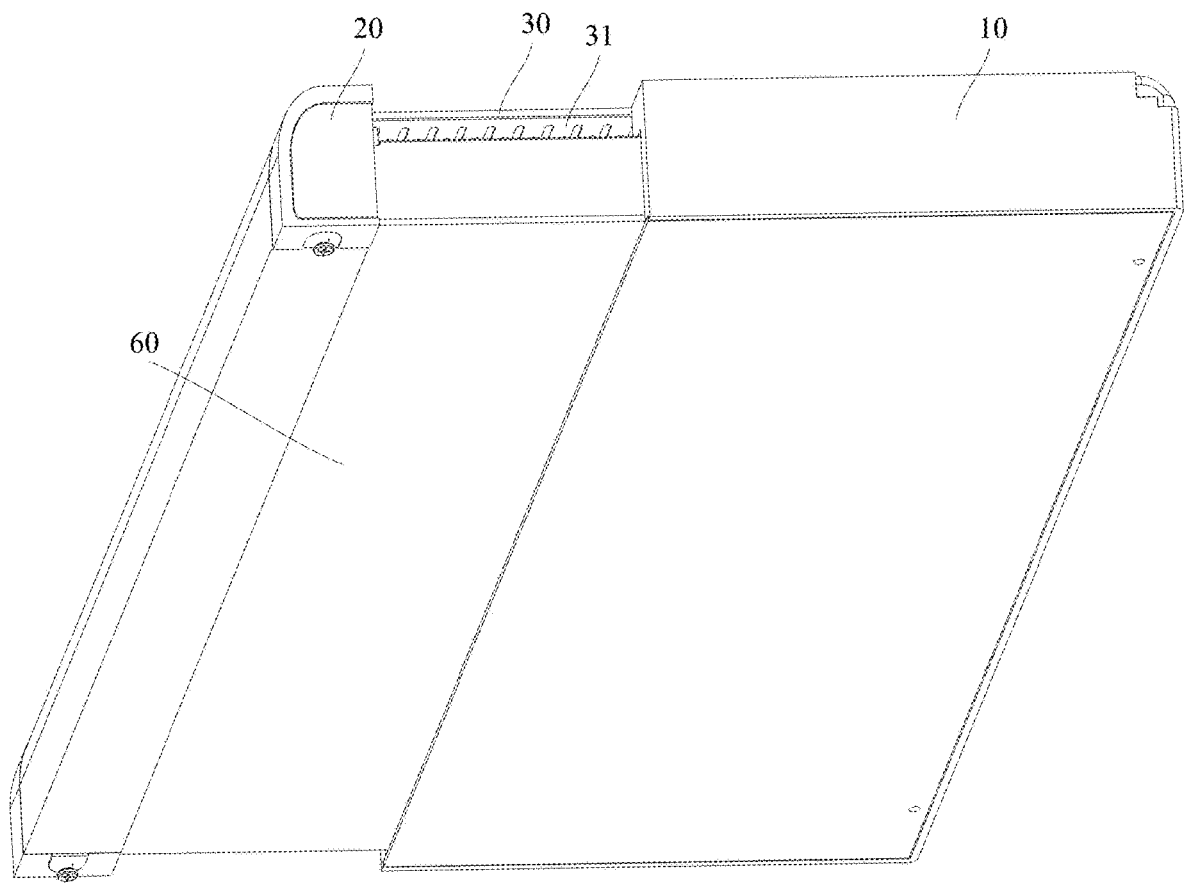
FIG. 11 is a schematic structural diagram of a display device according to an embodiment of the present disclosure.

FIG. 11 is a schematic structural diagram of a display device according to an embodiment of the present disclosure. As shown in FIG. 11, the display device further includes a baffle plate 60. The baffle plate 60 is located on a second face of a second housing 20. The baffle plate 60 is connected with the second housing 20. The flexible display panel 30 is located on one face of the baffle plate 60 closer to the second housing 20.

By providing the baffle plate 60, a portion of the flexible display panel 30 bent to the second face of the second housing 20 can be protected from being damaged.

As shown in FIG. 10, the recovery plate 50 is provided with a rolling member 53. The rolling member 53 may rotate relative to the recovery plate 50. The rolling member 53 forms a fit with the baffle plate 60 in a rolling manner.

For example, the rolling member 53 is cylindrical, a surface of the recovery plate 50 has a clamp groove 50a, and the rolling element 53 is partially located in the clamp groove 50a.

The rolling member 53 not only functions to support so as to prevent the recovery plate 50 and the flexible display panel 30 from directly contacting the baffle plate 60 and scratching the surface of the flexible display panel 30, but also rolls on a surface of the baffle plate 60 with small resistance and smooth movement, during the movement of the recovery plate 50 in a case that the first housing 10 and the second housing 20 are relatively pushed and pulled.

Figure 12:
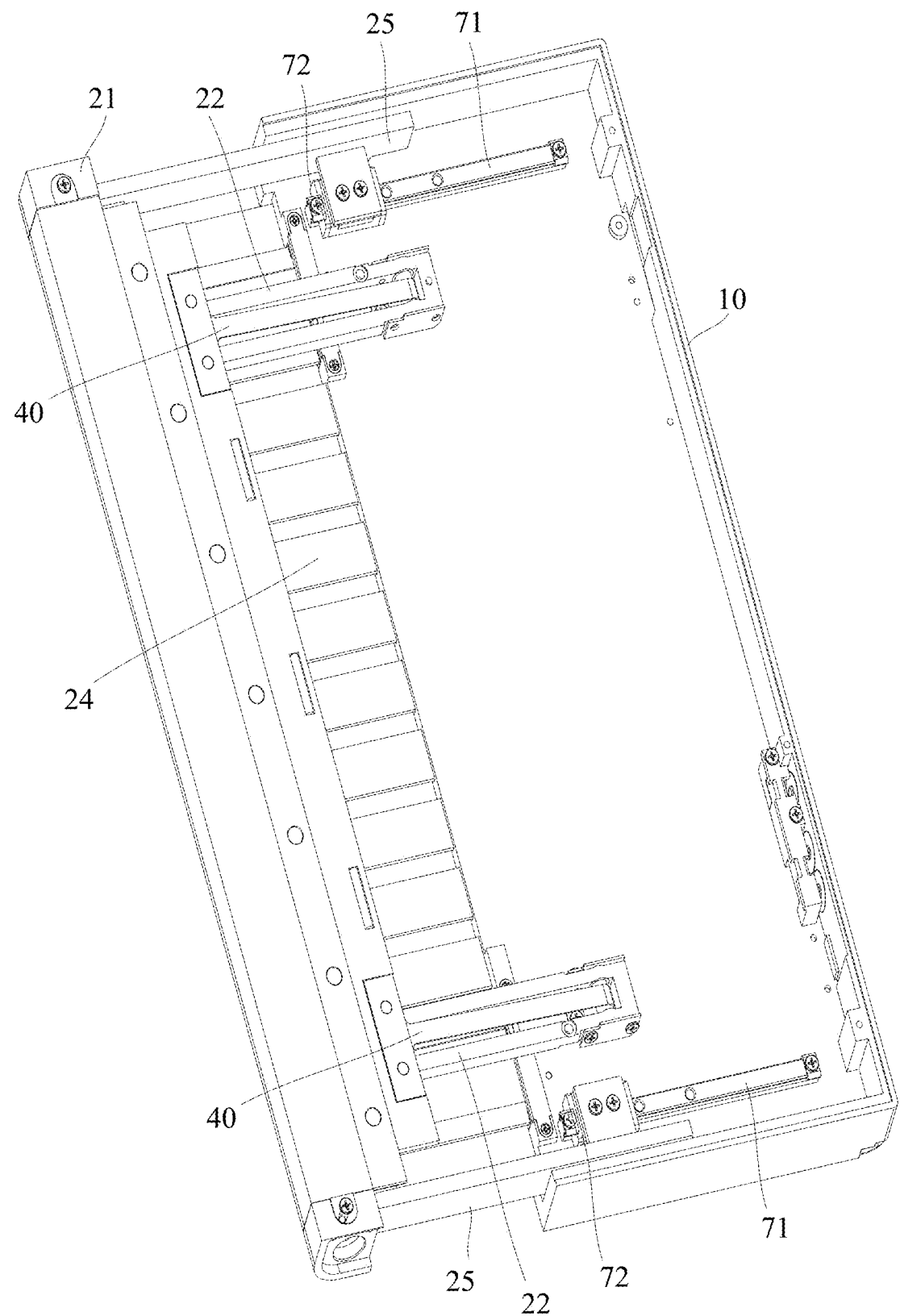
FIG. 12 is a schematic connection diagram of a first housing and a second housing according to an embodiment of the present disclosure.

FIG. 12 is a schematic connection diagram of a first housing and a second housing according to an embodiment of the present disclosure. As shown in FIG. 12, the display device further includes a guide rail 71 and a sliding block 72. The sliding block 72 is slidably connected with the guide rail 71. One of the first housing 10 and the second housing 20 is connected with the guide rail 71, and the other is connected with the sliding block 72, such that the first housing 10 and the second housing 20 can move more smoothly relative to each other.

The display device may include a plurality of guide rails 71 and a plurality of sliding blocks 72. The guide rails 71 and the sliding blocks 72 are provided in one-to-one correspondence, and the plurality of guide rails 71 are parallel to each other. For example, in an embodiment of the present disclosure, the display device includes two guide rails 71 and two sliding blocks 72.

As shown in FIG. 12, the plurality of guide rails 71 are located in the first housing 10, and one end of each of the plurality of guide rails 71 is closer to an opening 10a. The guide rail 71 is connected with the first housing 10, for example, by a screw. The sliding block 72 is slidably connected with the guide rail 71. The sliding block 72 is connected with the second housing 20, for example, by a screw. In an embodiment of the present disclosure, the second housing 20 further includes a sliding block fixation plate 25, and the sliding block fixation plate 25 is located on an end of a roller bracket 211 and connected with the roller bracket 211. The sliding block 72 is connected with the sliding block fixation plate 25 by a screw.

Figure 13:
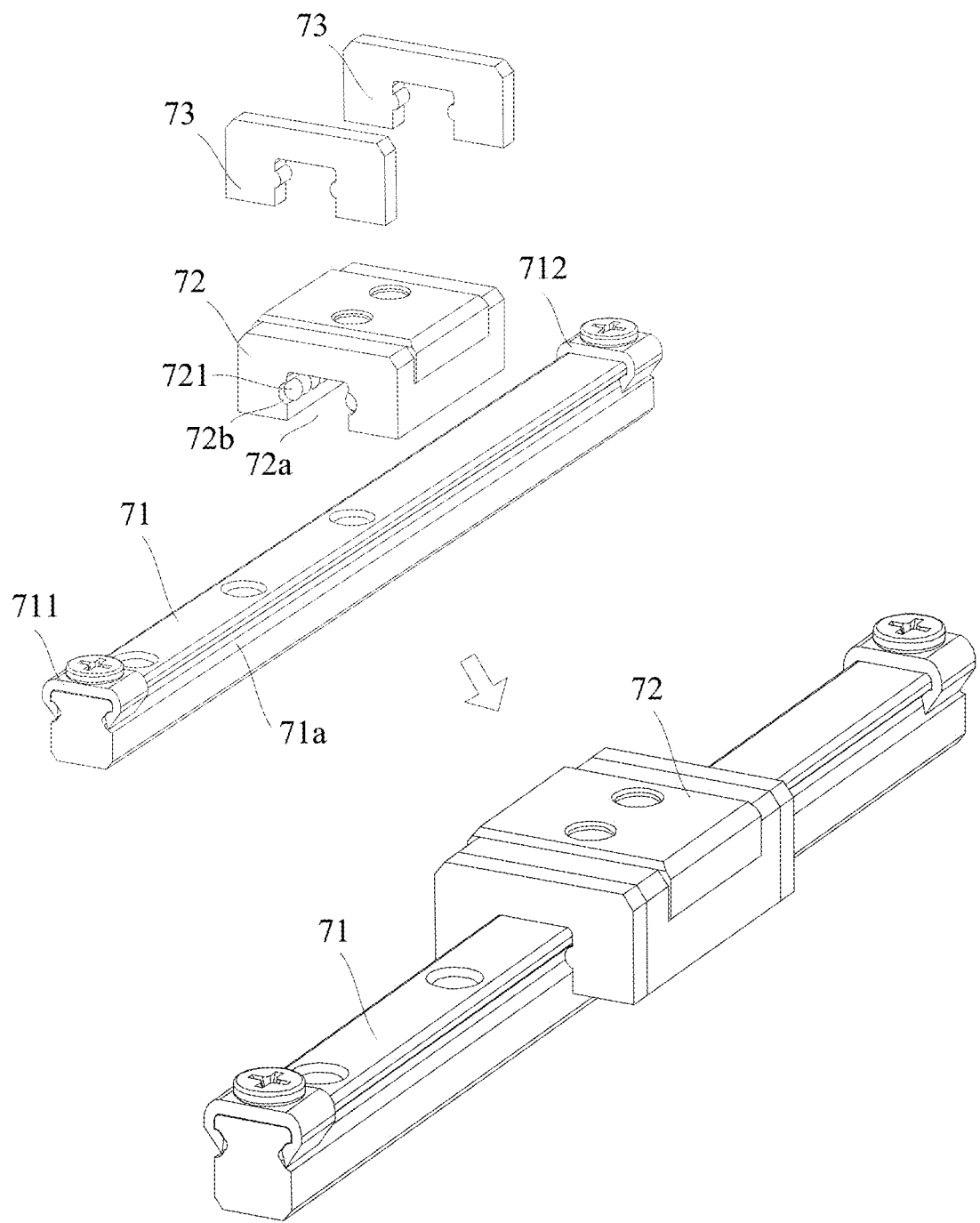
FIG. 13 is a schematic assembly diagram of a sliding block and a guide rail according to an embodiment of the present disclosure.

FIG. 13 is a schematic assembly diagram of a sliding block and a guide rail according to an embodiment of the present disclosure. As shown in FIG. 13, the sliding block 72 has a clamp groove 72a, and the guide rail 71 is located in the clamp groove 72a. By enabling the clamp groove 72a to form a fit with the guide rail 71, the sliding block 72 can move along the guide rail 71. Stopping blocks 711 may be connected at both ends of the guide rail 71 to limit the range of movement of the sliding block 72 and prevent the sliding block 72 from detaching from an end of the guide rail 71.

A side wall of the clamp groove 72a has a first groove 72b, and the first groove 72b is provided with a ball 721. A side wall of the guide rail 71 is provided with a second groove 71a extending along a length direction thereof, the first groove 72b is opposite to the second groove 71a, and the ball 721 is partially located in the second groove 71a.

By providing the ball 721 in the first groove 72b and the second groove 71a, the ball 721 rolls in the second groove 71a in a case that the sliding block 72 moves relative to the guide rail 71, thereby reducing the frictional resistance to the sliding block 72 and making the movement of the sliding block 72 smoother.

A plurality of balls 721 may be provided in each of the first grooves 72b, and the plurality of balls 721 are arranged along a length direction of the first groove 72b. In a case that the sliding block 72 is installed on the guide rail 71, the first groove 72b extends in the same direction as the second groove 71a, the plurality of balls 721 are all partially located in the second groove 71a, and the plurality of balls 721 roll in the second groove 71a in a case that the sliding block 72 slides relative to the guide rail 71.

Figure 14:
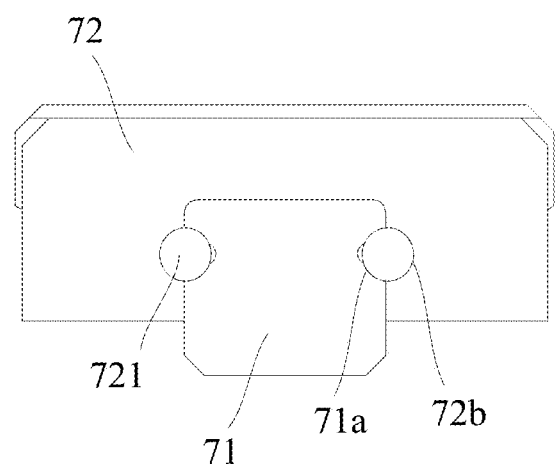
FIG. 14 is a schematic fit diagram of a sliding block and a guide rail according to an embodiment of the present disclosure.

FIG. 14 is a schematic fit diagram of a sliding block and a guide rail according to an embodiment of the present disclosure. As shown in FIG. 14, a cross section of a first groove 72b and a cross section of a second groove 71a are both circular arc-shaped. A radius of the cross section of the first groove 72b and a radius of the cross section of the second groove 71a are both the same as a radius of the ball 721.

The fit accuracy between the ball 721 and the first groove 72b, and fit accuracy between the ball 721 and the second groove 71a will affect the smoothness of the movement of the sliding block 72. The radius of the cross section of the first groove 72b and the radius of the cross section of the second groove 71a are both the same as the radius of the ball 721, such that the ball 721 is in 0-clearance contact with the first groove 72b and the second groove 71a, thereby ensuring that the sliding block 72 can move smoothly.

Optionally, the cross section of the second groove 71a is semi-circular.

Since the cross section of the second groove 71a is semi-circular, the sliding block 72 can bear load along a depth direction of a clamp groove 72a, such that the sliding block 72 is not easy to detach from the guide rail 71, which is conducive to prolonging the service life of the sliding block 72 and the guide rail 71 and improving the bearing capacity of the guide rail 71.

By adjusting a diameter of the ball 721, the fit accuracy between the clamp groove 72a of the sliding block 72 and the guide rail 71 can also be adjusted. For example, the clamp groove 72a and the guide rail 71 may be transition fit, that is, clearance fit or interference fit. For example, a clearance is −3 to 3 microns, so as to avoid a situation that too much looseness form between the sliding block 72 and the guide rail 71 to affect a relative movement between the first housing 10 and the second housing 20.

As shown in FIG. 13, the display device further includes two end caps 73. The two end caps 73 are located on both ends of a clamp groove 72a, respectively. The two end caps 73 are both connected with a sliding block 72, for example, by a screw.

The end caps 73 are provided at two ends of the clamp groove 72a to block the ball 721, such that the ball 721 can be prevented from detached from the sliding block 72, and a sealing effect can be achieved to prevent foreign matters such as dust from entering a first groove 72b and affecting the rolling of the ball 721.

In some embodiments, the display device may further include a driver structure, the driver structure is connected with the sliding block 72 to drive the sliding block 72 to slide along the guide rail 71. For example, the driver structure may include a motor. By providing the driver structure to drive the sliding block 72, the second housing 20 can automatically stretch and retract relative to the first housing 10.

Described above are merely optional embodiments of the present disclosure and are not intended to limit the present disclosure. Any modifications, equivalents, improvements, and the like, made within the spirit and principle of the present disclosure, should be included in the protection scope of the present disclosure.

What is claimed is:

1. A display device, wherein the display device comprises a first housing, a second housing, a flexible display panel, and a tension strip;
   one side of the first housing has an opening;
   the second housing is partially accommodated in the opening and can stretch and retract relative to the first housing, the second housing comprises a support part, a push rod and a pulley, one end of the push rod is connected with the support part, the pulley is located on the other end of the push rod, the support part comprises a roller and a roller bracket, the roller and the push rod are located on two opposite sides of the roller bracket and connected with the roller bracket, the support part further comprises a plurality of magnetic rings, the plurality of magnetic rings are sleeved outside the roller, one face of the flexible display panel closer to the magnetic rings is provided with a flexible support plate, and the flexible support plate is ferromagnetic;
   one end of the flexible display panel is located on a first face of the second housing, and is located on one side of the first housing and connected with the first housing, the other end of the flexible display panel rounds the support part and extends to a second face of the second housing, and the second face of the second housing is a face opposite to the first face of the second housing; and
   the tension strip is located in the first housing, one end of the tension strip is located on the second face of the second housing and connected with the flexible display panel, and the other end of the tension strip rounds the pulley, extends to the first face of the second housing and is connected with the first housing.

2. The display device according to claim 1, wherein the second housing further comprises a sliding plate, the sliding plate and the push rod are located on a same side of the roller bracket, and the sliding plate is connected with the roller bracket and slidably connected with the first housing.

3. The display device according to claim 2, wherein a surface of the sliding plate closer to the flexible display panel is provided with a plurality of magnetic sheets.

4. The display device according to claim 1, wherein the flexible support plate comprises a first support plate, a second support plate, and a connection plate, wherein the first support plate and the connection plate are located on opposite sides of the second support plate, the first support plate is connected with an outer wall of the first housing, a plurality of strip-shaped holes are distributed on the second support plate, the second support plate extends from the first face to the second face of the second housing, and the connection plate is connected with the tension strip.

5. The display device according to claim 1, wherein the push rod has a strip-shaped groove extending along a length direction thereof, and the pulley is located in the strip-shaped groove.

6. The display device according to claim 1, wherein the second housing comprises a plurality of push rods and a plurality of pulleys in one-to-one correspondence, and the plurality of push rods are arranged in parallel at intervals; and
   the display device comprises a plurality of tension strips, the plurality of tension strips are arranged in one-to-one correspondence with the plurality of pulleys, and the plurality of tension strips round the corresponding pulleys.

7. The display device according to claim 6, wherein the display device further comprises a recovery plate, the recovery plate is located on the second face of the second housing and connected with an edge of the flexible display panel; and the plurality of tension strips are all connected with the recovery plate.

8. The display device according to claim 7, wherein the display device further comprises a baffle plate, the baffle plate is located on the second face of the second housing and connected with the second housing, and the flexible display panel is located on one face of the baffle plate closer to the second housing; and the recovery plate is provided with a rolling member, and the rolling member forms a fit with the baffle plate in a rolling manner.

9. The display device according to claim 1, wherein the display device further comprises a plurality of guide rails and a plurality of sliding blocks, the plurality of guide rails are located in the first housing and connected with the first housing, the plurality of guide rails are parallel to each other, and one end of each of the plurality of guide rails is closer to the opening; and the sliding block is slidably connected with the guide rail and connected with the second housing.

10. The display device according to claim 9, wherein the sliding block has a clamp groove, a side wall of the clamp groove has a first groove, and the first groove is provided with a ball; and the guide rail is located in the clamp groove, a side wall of the guide rail is provided with a second groove extending along a length direction thereof, the first groove is opposite to the second groove, and the ball is partially located in the second groove.

11. The display device according to claim 10, wherein a cross section of the first groove and a cross section of the second groove are circular arc-shaped, and a radius of the cross section of the first groove and a radius of the cross section of the second groove are both the same as a radius of the ball.

12. The display device according to claim 11, wherein the cross section of the second groove is semi-circular.

13. The display device according to claim 10, wherein the display device further comprises two end caps, the two end caps are located on two ends of the clamp groove and connected with the sliding block.

\* \* \* \* \*